(12) United States Patent
Nakazawa

(10) Patent No.: US 11,216,223 B2
(45) Date of Patent: Jan. 4, 2022

(54) INFORMATION PROCESSING APPARATUS, IMAGE FORMING APPARATUS, AND NON-TRANSITORY COMPUTER READABLE MEDIUM

(71) Applicant: FUJIFILM Business Innovation Corp., Tokyo (JP)

(72) Inventor: Toshiya Nakazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/920,405

(22) Filed: Jul. 2, 2020

(65) Prior Publication Data

US 2021/0286567 A1 Sep. 16, 2021

(30) Foreign Application Priority Data

Mar. 11, 2020 (JP) .............................. JP2020-041585

(51) Int. Cl.
*G06F 15/00* (2006.01)
*G06K 1/00* (2006.01)
*G06K 15/00* (2006.01)
*G06F 3/12* (2006.01)

(52) U.S. Cl.
CPC ............ *G06F 3/1219* (2013.01); *G06F 3/121* (2013.01); *G06F 3/1204* (2013.01); *G06F 3/1234* (2013.01); *G06F 3/1255* (2013.01)

(58) Field of Classification Search
CPC ...... G06F 3/1219; G06F 3/1204; G06F 3/121; G06F 3/1234; G06F 3/1255
USPC ............................... 358/1.14, 1.15, 1.13, 1.1
See application file for complete search history.

(56) References Cited

U.S. PATENT DOCUMENTS

| | | | |
|---|---|---|---|
| 2014/0204414 A1* | 7/2014 | Jang | H04N 1/00244 358/1.15 |
| 2015/0153977 A1* | 6/2015 | Tanaka | G06F 3/1234 358/1.14 |
| 2019/0310807 A1* | 10/2019 | Yagi | G06F 3/1259 |
| 2020/0241813 A1* | 7/2020 | Shrestha | G06F 3/1273 |
| 2020/0242429 A1* | 7/2020 | Tanaka | G06K 15/1848 |

FOREIGN PATENT DOCUMENTS

| | | |
|---|---|---|
| JP | 2001075770 | 3/2001 |
| JP | 2007168103 | 7/2007 |

* cited by examiner

*Primary Examiner* — Douglas Q Tran
(74) *Attorney, Agent, or Firm* — JCIPRNET

(57) ABSTRACT

An information processing apparatus includes a processor. The processor is configured to transition to a standby state upon detecting occurrence of an error on a printer that is a destination of transmission of print data. The standby state is for receiving image data for identifying a page from which printing is to be resumed. The processor is also configured to recognize an image of the image data connected with the printer when the image data is received and identify the page from which the printing is to be resumed. The processor is also configured to retransmit, to the printer, print data for one or more pages starting from the identified page.

13 Claims, 16 Drawing Sheets

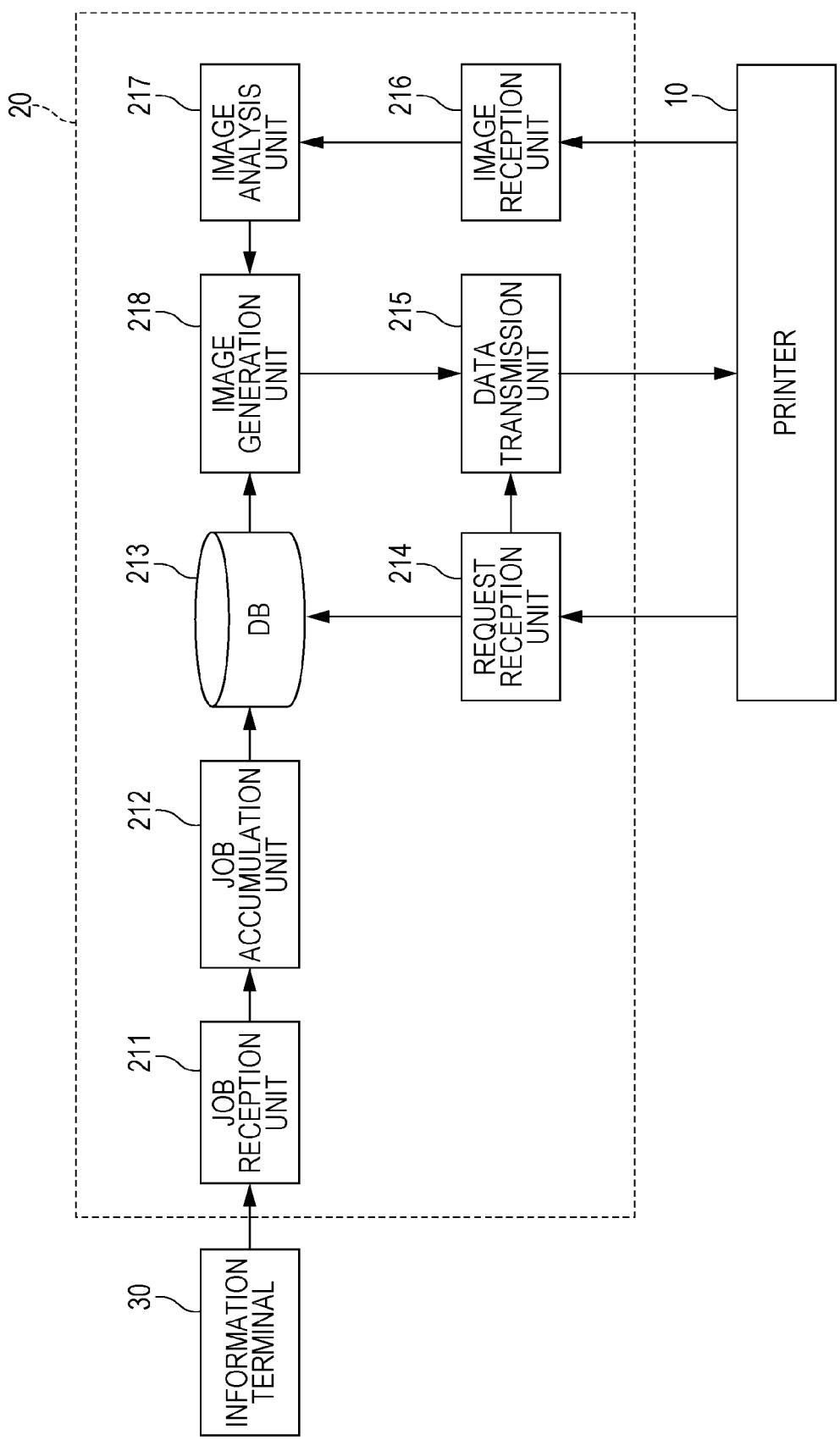

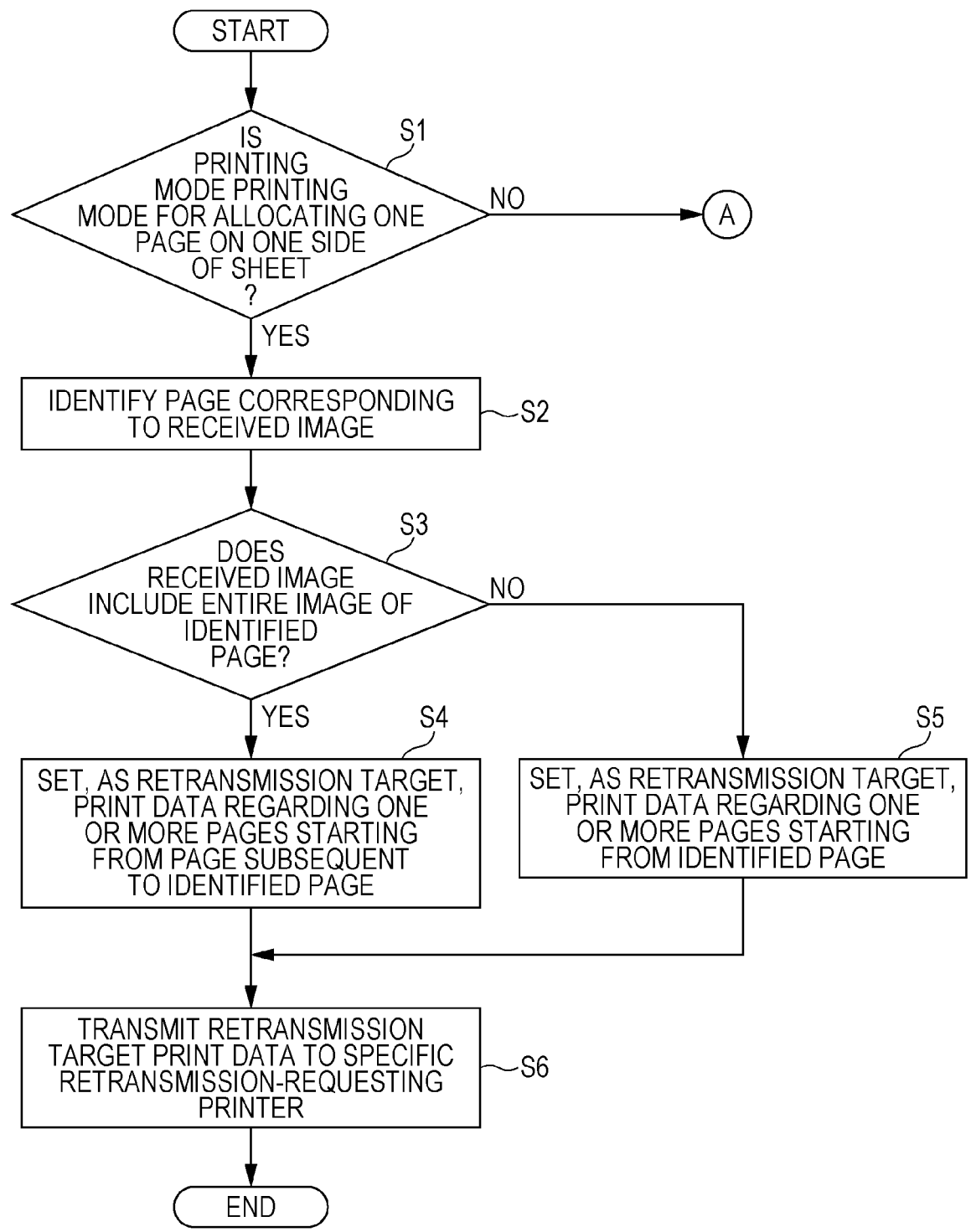

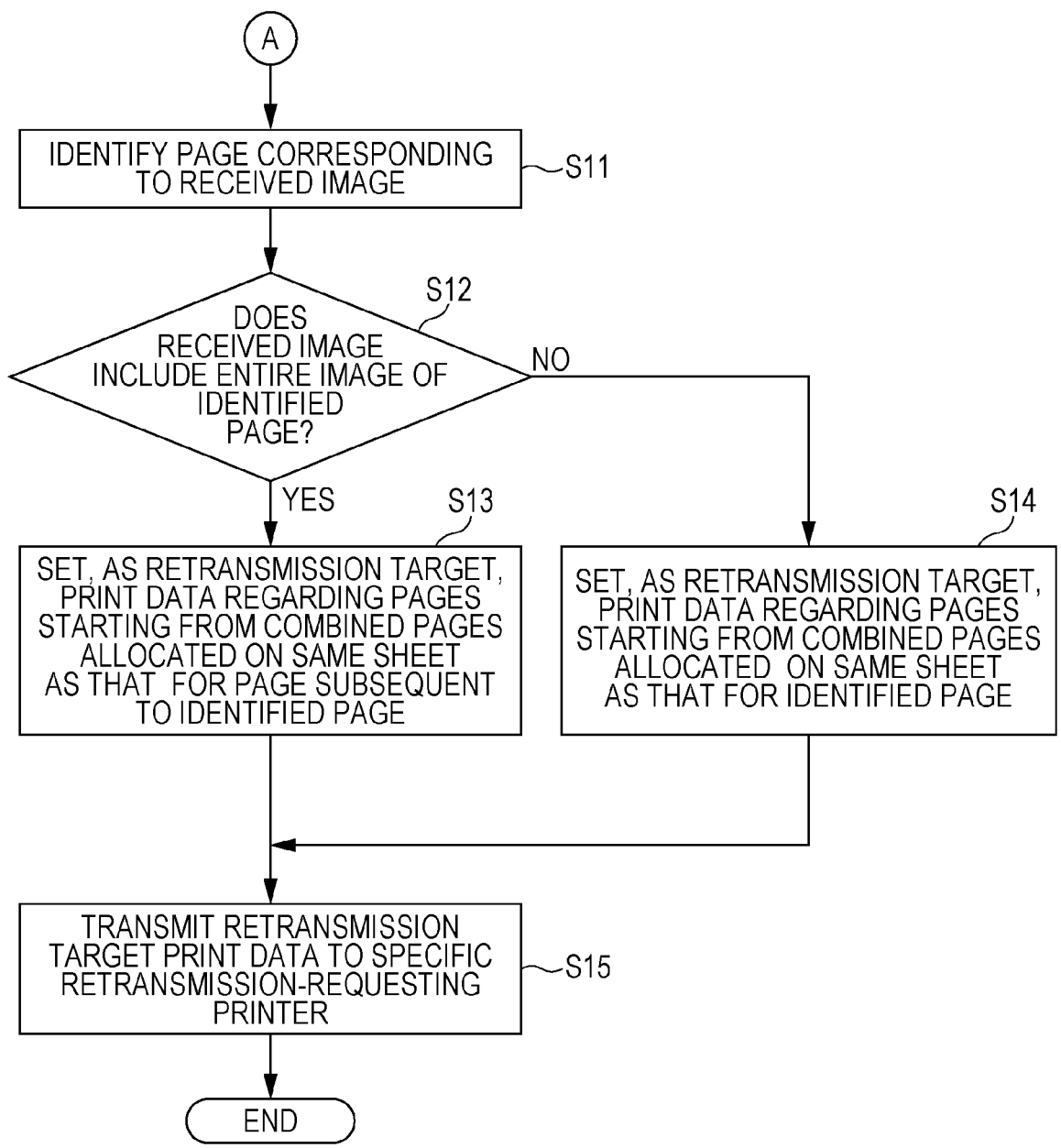

FIG. 8

T1 TRANSMIT PRINT DATA
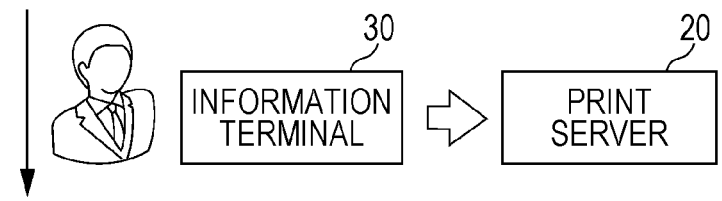

T2 GIVE INSTRUCTION FOR PRINTING
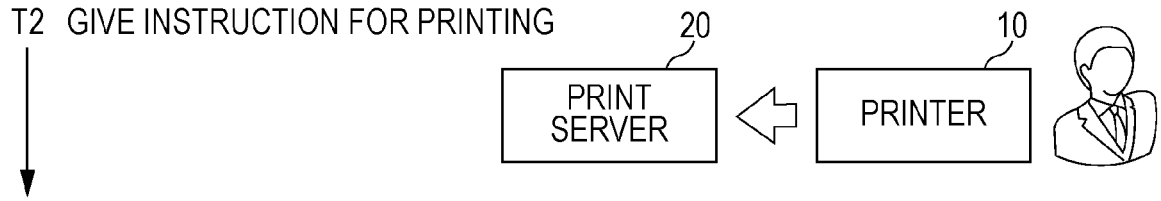

T3 TRANSMIT PRINT DATA

T4 ERROR DURING SECOND PAGE PRINTING
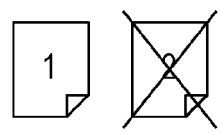

T5 SCAN IMAGE ON SHEET CORRESPONDING TO SECOND PAGE WITH SCANNER AND TRANSMIT IMAGE TO PRINT SERVER
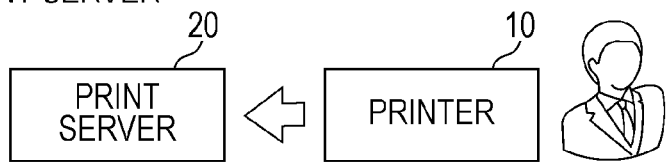

T6 IDENTIFY PAGE CORRESPONDING TO RECEIVED IMAGE AS SECOND PAGE AND INCOMPLETION OF PRINTING. TRANSMIT PRINT DATA REGARDING ONE OR MORE PAGES STARTING FROM SECOND PAGE UPON RECEIVING REPRINTING INSTRUCTION
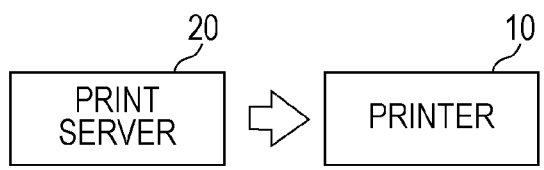

T7 RESUME PRINTING FROM SECOND PAGE
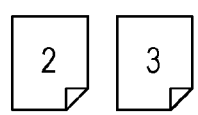

T8 PRINTING RESULTS OF ALL PAGES ARE OBTAINED
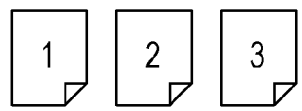

FIG. 9

T1 TRANSMIT PRINT DATA
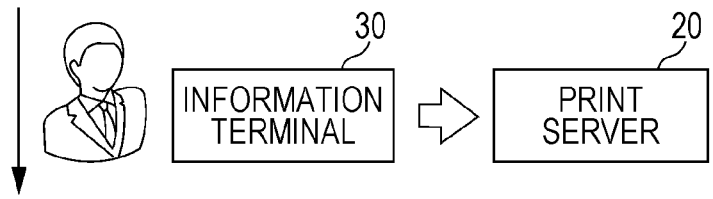

T2 GIVE INSTRUCTION FOR PRINTING
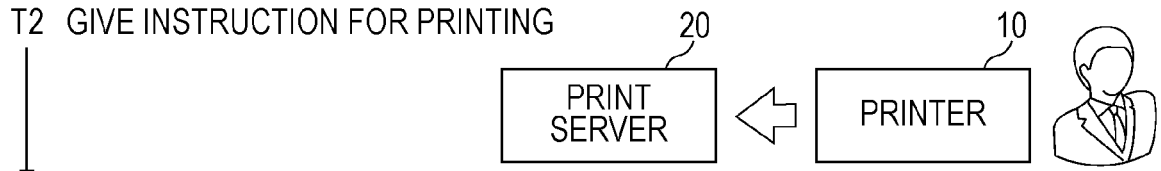

T3 TRANSMIT PRINT DATA

T4 ERROR DURING SECOND PAGE PRINTING
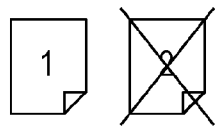

T5 SCAN IMAGE ON SHEET CORRESPONDING TO FIRST PAGE WITH SCANNER AND TRANSMIT IMAGE TO PRINT SERVER
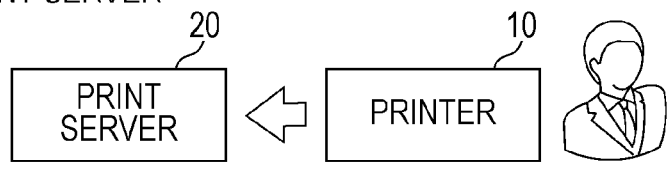

T6 IDENTIFY PAGE CORRESPONDING TO RECEIVED IMAGE AS FIRST PAGE AND COMPLETION OF PRINTING. TRANSMIT PRINT DATA REGARDING ONE OR MORE PAGES STARTING FROM SECOND PAGE UPON RECEIVING REPRINTING INSTRUCTION
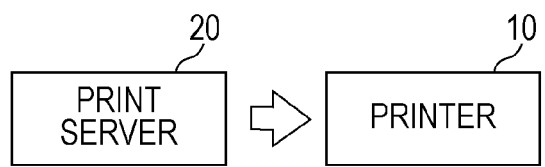

T7 RESUME PRINTING FROM SECOND PAGE
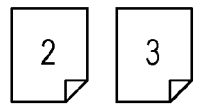

T8 PRINTING RESULTS OF ALL PAGES ARE OBTAINED
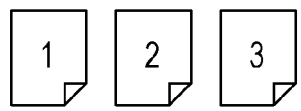

X : PAGE HAVING ERROR DURING PRINTING

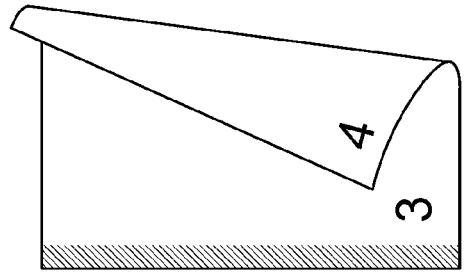
FIG. 11A
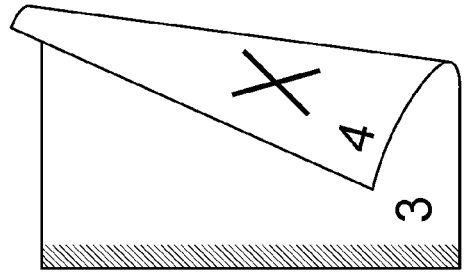
FIG. 11B
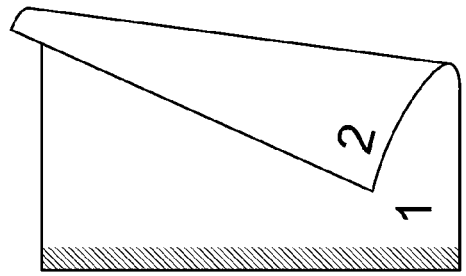
✗ : PAGE HAVING ERROR DURING PRINTING

✕ : PAGE HAVING ERROR DURING PRINTING

✗ : PAGE HAVING ERROR DURING PRINTING

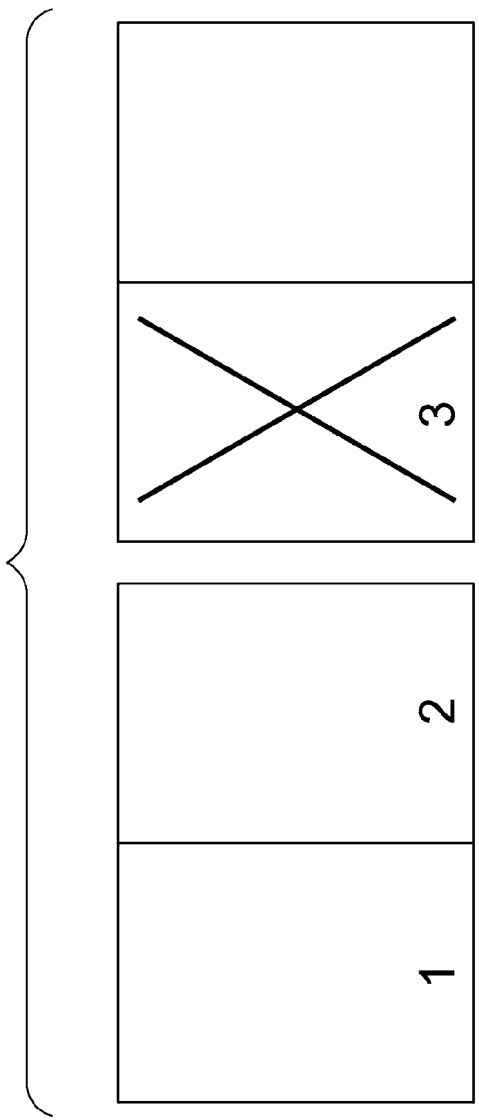

FIG. 15A
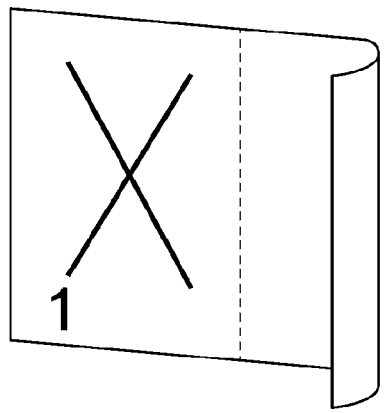
FIG. 15B
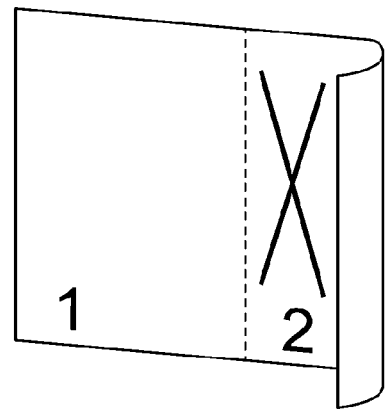
FIG. 15C
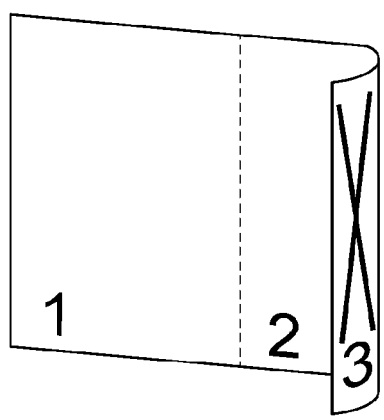
FIG. 15D
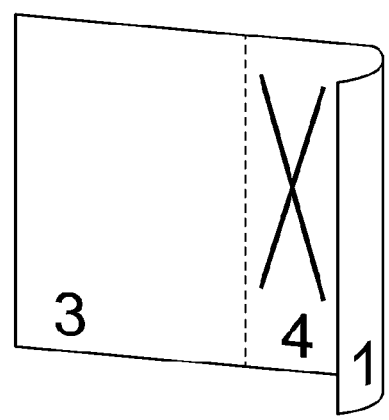
FIG. 15E
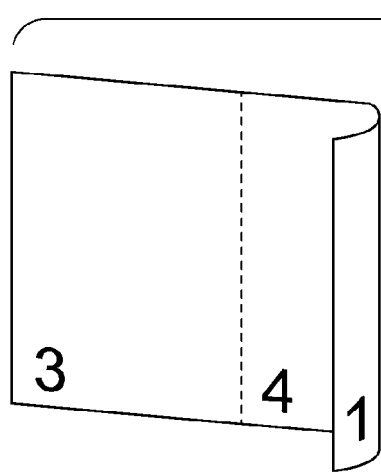 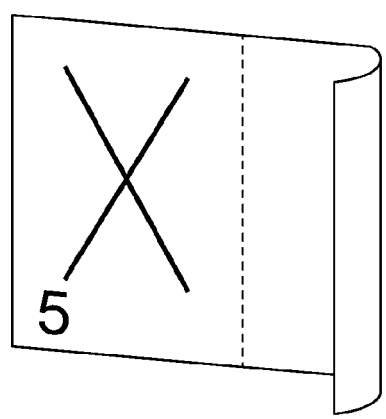

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-041585 filed Mar. 11, 2020.

BACKGROUND

(i) Technical Field

The present disclosure relates to an information processing apparatus, an image forming apparatus, and a non-transitory computer readable medium.

(ii) Related Art

Japanese Unexamined Patent Application Publication No. 2007-168103 describes resumption of printing after occurrence of an error such as a paper jam during printing. Specifically, if an error occurs, an image of a page to be recovered is saved in a hard-disk device in the printer. After the error is eliminated, the printing is resumed from the image of the page saved in the hard-disk device.

SUMMARY

Printers installed in the shared offices and public places are required to be operated not to leave print data in the hard-disk device of the printers from a security viewpoint. Actually, a printer without a memory device such as a hard disk is used as the printer installed in the shared offices and public places. To resume the printing suspended due to an error or the like in the printer without the memory device, the printing is performed from the initial page because print data is not present in the printer. If an error recurs multiple times, the printing is resumed from the initial page every time. This wastes sheets. In a printer based on a meter rate charging system, pages printing of which is finished are also printed, and a user needs to pay an originally unnecessary fee.

Aspects of non-limiting embodiments of the present disclosure relate to preventing page missing or a repeated page after resumption of printing compared with a case where a user designates the number of a page from which the printing is to be resumed.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor. The processor is configured to transition to a standby state upon detecting occurrence of an error on a printer that is a destination of transmission of print data. The standby state is for receiving image data for identifying a page from which printing is to be resumed. The processor is also configured to recognize an image of the image data connected with the printer when the image data is received and identify the page from which the printing is to be resumed. The processor is also configured to retransmit, to the printer, print data for one or more pages starting from the identified page.

BRIEF DESCRIPTION OF THE DRAWINGS

Exemplary embodiments of the present disclosure will be described in detail based on the following figures, wherein:

FIG. 4 is a diagram explaining an example functional configuration of the print server used in Exemplary Embodiment 1;

FIG. 6 is a flowchart explaining an example of processing performed when a printing mode for allocating one page on one side of a sheet is selected;

FIG. 7 is a flowchart explaining an example of processing performed when a printing mode for allocating multiple pages on one side of a sheet or a printing mode for allocating one or more pages on both sides of a sheet is selected;

FIG. 8 is a diagram explaining the flow of processing performed in a case where the image of an error page is transmitted to the print server when an error occurs during printing in the printing mode for allocating one page on one side of a sheet;

FIG. 9 is a diagram explaining the flow of processing performed in a case where the image of the last page of finished printed pages is transmitted to the print server when an error occurs during printing in the printing mode for allocating one page on one side of a sheet;

FIGS. 11A and 11B are diagrams explaining the flow of different processing performed in a case where the image of an error page is transmitted to the print server when an error occurs during printing in the printing mode for allocating one page on each of both sides of a sheet, FIG. 11A illustrating error occurrence during the printing of the fourth page of a document, FIG. 11B illustrating the resumption of the printing from the third page allocated on the same sheet as that for the fourth page that has the error or that is subsequent to the third page as the last page of finished printed pages;

FIGS. 14A and 14B are diagrams explaining the flow of different processing performed in a case where the image of an error page is transmitted to the print server when an error occurs during printing in the printing mode for allocating two pages on one side of a sheet, FIG. 14A illustrating error occurrence during the printing of the third page of a document, FIG. 14B illustrating the resumption of the printing from the first page of the second sheet;

FIGS. 15A, 15B, 15C, 15D, and 15E are diagrams explaining the flow of processing performed in a case where the image of an error page is transmitted to the print server when an error occurs during printing in a printing mode for allocating two pages on each of both sides of a sheet, FIG. 15A illustrating error occurrence during the printing of the first page of a document, FIG. 15B illustrating error occurrence during the printing of the second page of the document, FIG. 15C illustrating error occurrence during the printing of the third page of the document, FIG. 15D illustrating error occurrence during the printing of the fourth page of the document, FIG. 15E illustrating error occurrence during the printing of the fifth page of the document.

DETAILED DESCRIPTION

Hereinafter, exemplary embodiments of the present disclosure will be described with reference to the drawings.

Exemplary Embodiment 1

System Configuration

Figure 1:
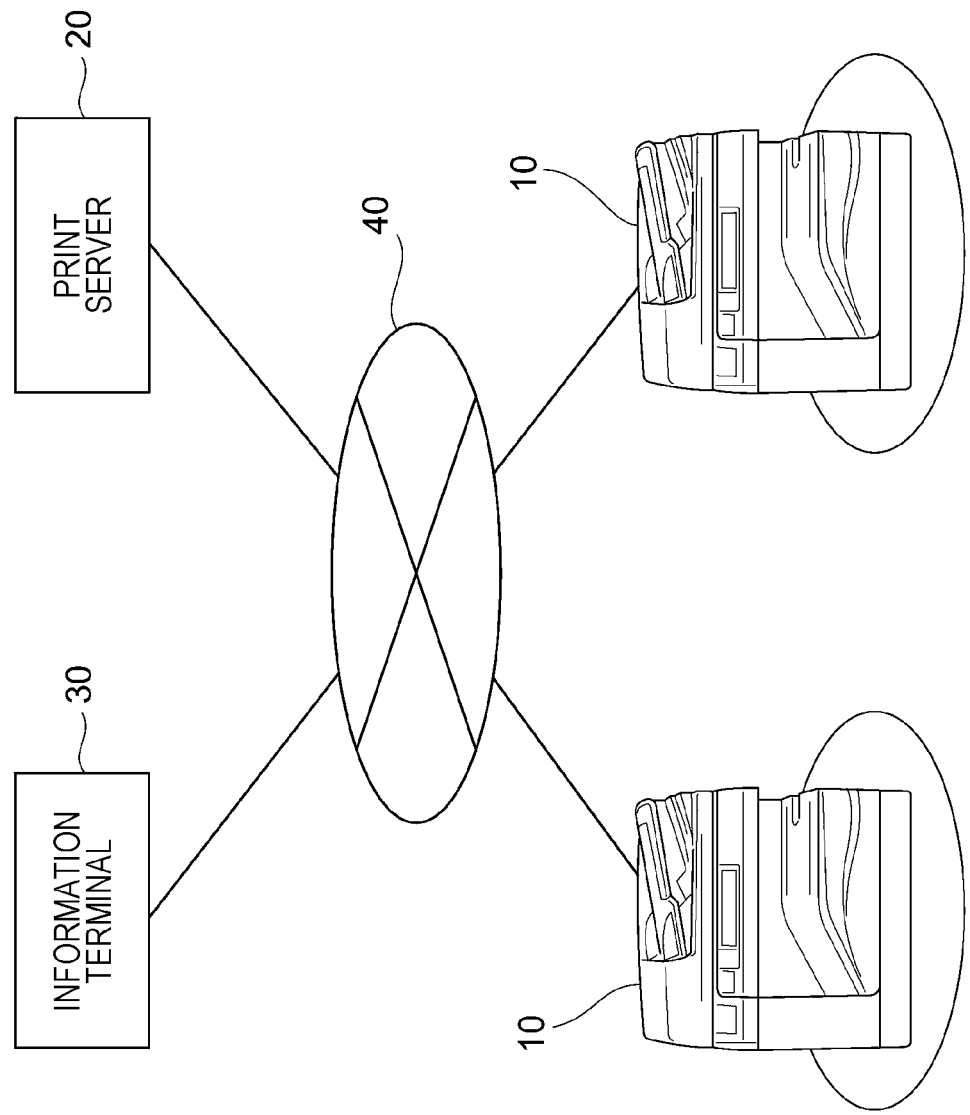
FIG. 1 is a diagram illustrating an example configuration of an information processing system used in Exemplary Embodiment 1.

FIG. 1 is a diagram illustrating an example configuration of an information processing system 1 used in Exemplary Embodiment 1.

The information processing system 1 illustrated in FIG. 1 includes printers 10 each having a printing function, a print server 20 that manages printing by each printer 10, and an information terminal 30 that transmits image data to the print server 20. These apparatuses are each connected to a network 40. The network 40 is, for example, the Internet. Part of the network 40 may be a local area network (LAN).

The printer 10 in this exemplary embodiment is installed in the shared office, the public place, or the like and used by unspecific users.

The printer 10 used in this exemplary embodiment has a copying function of generating a duplicate of a document, a printing function of printing text or an image on the sheet, a scanning function of optically reading the image of the document, a function of acquiring information required for user authentication, and the like. The printer 10 in this exemplary embodiment indispensably has the printing function and the scanning function.

All of the printer 10 included in the information processing system 1 do not have to have the same function and the same capability. However, to ensure the security, at least one of the printers 10 does not have a hard-disk device that stores print data and immediately erase print data printing regarding which is finished.

Each printer 10 in this exemplary embodiment is an example of an image forming apparatus.

The print server 20 in this exemplary embodiment manages the receiving of print data and output of the print data separately. The print server 20 stores the print data received from the information terminal 30 in the database (not illustrated) until a request for outputting print data is received. Upon receiving the print-data output request, the print server 20 transmits the print data to one of the printers 10 that requests the output.

The print server 20 in this exemplary embodiment is an example of an information processing apparatus.

In this exemplary embodiment, the information terminal 30 is, for example, a desktop computer, a notebook computer, a tablet computer, or a smartphone. The information terminal 30 is used to upload print data to the print server 20.

Printer Configuration

Figure 2:
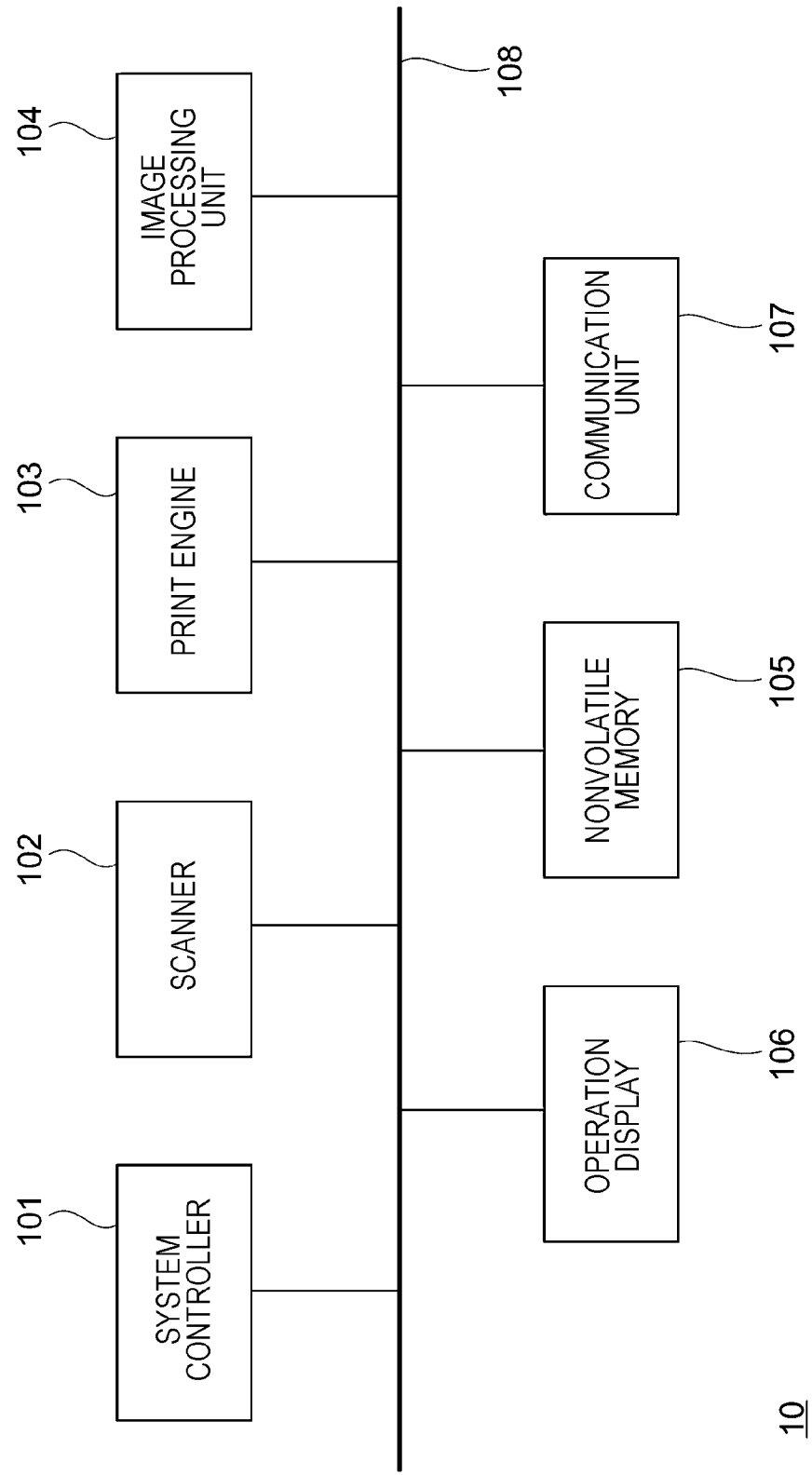
FIG. 2 is a diagram explaining an example configuration of a printer used in Exemplary Embodiment 1.

FIG. 2 is a diagram explaining an example configuration of the printer 10 used in Exemplary Embodiment 1.

The printer 10 illustrated in FIG. 2 includes a system controller 101, a scanner 102, a print engine 103, an image processing unit 104, a nonvolatile memory 105, an operation display 106, a communication unit 107, a bus 108 that connects these components, and signal lines (not illustrated). The system controller 101 controls overall system operation. The scanner 102 optically reads the image of a document. The print engine 103 forms an image on the front surface of a sheet that is an example of a recording medium. The image processing unit 104 performs additional processing such as color correction or tone correction on print data. The nonvolatile memory 105 stores print data and the like. The operation display 106 is used for receiving an instruction from a user and displaying information. The communication unit 107 is used for communications with an external apparatus.

The system controller 101 includes a central processing unit (CPU), a read only memory (ROM) storing firmware, basic input output system (BIOS), and the like, a random access memory (RAM) used as a work area, and other components. The system controller 101 is what is known as a computer and provides various functions by running programs. The CPU is an example of a processor.

The scanner 102 is a device that optically reads the image of a document and is an example of an image reading unit. The scanner 102 in this exemplary embodiment is provided with a mechanism for transporting sheets of a document one by one to a reading position. The mechanism of this type is called, for example, an auto document feeder (ADF). The scanner 102 in this exemplary embodiment is used to obtain an image used for identifying the location of an error occurring during printing. The image obtained by the scanner 102 is transmitted as image data to the print server 20.

The print engine 103 is a device that prints an image on the front surface of a sheet with an electrophotographic system, an inkjet system, or the like. The sheet is an example of a recording medium. The print engine 103 is also provided with a mechanism for transporting sheets one by one. The print engine 103 is an example of an image forming unit.

The image processing unit 104 includes a dedicated processor, a processing circuit, and other components for processing print data to obtain data suitable for printing or the like.

The nonvolatile memory 105 is a storage medium used for recording print data downloaded from the print server 20 and other pieces of data. As the nonvolatile memory 105, for example, a dynamic random access memory (DRAM) or a static ram (SRAM) is used. The nonvolatile memory 105 is capable of keeping data only during power supply. The print data stored in the nonvolatile memory 105 is deleted from the nonvolatile memory 105 after printing is finished. If an error such as power disconnection occurs during the printing, the print data is erased from the nonvolatile memory 105 even though the printing is not finished.

The operation display 106 is a device used to present information to the user and to input an instruction by them. The operation display 106 is composed of, for example, a touch panel.

The communication unit 107 includes modules conforming to various communication standards. The communication unit 107 is connected to the network 40 through a mobile communication system abbreviated as, for example, LAN, 4G, or 5G.

Print Server Configuration

Figure 3:
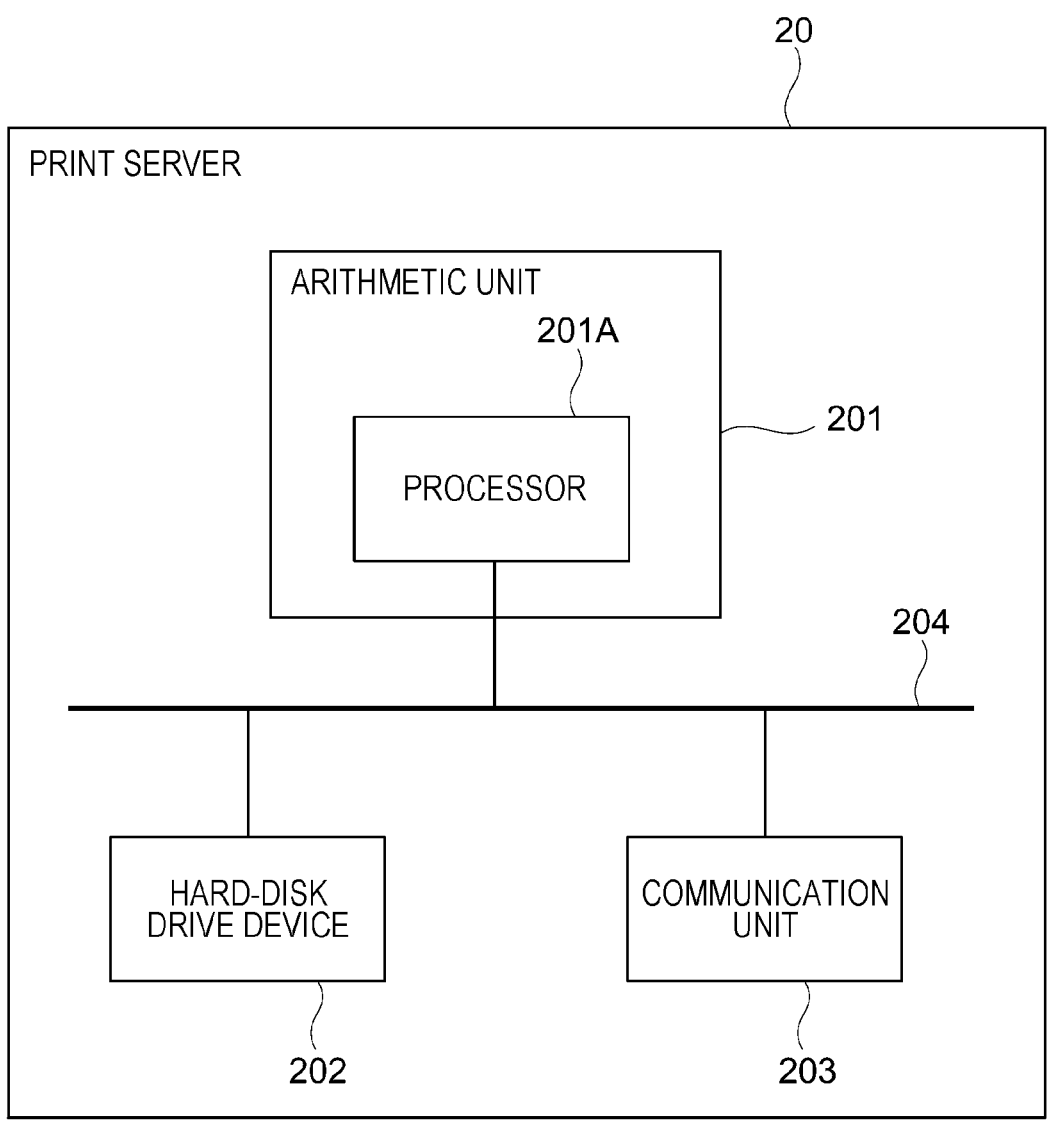
FIG. 3 is a diagram explaining an example hardware configuration of a print server used in Exemplary Embodiment 1.

FIG. 3 is a diagram explaining an example hardware configuration of the print server 20 used in Exemplary Embodiment 1.

The print server 20 illustrated in FIG. 3 includes an arithmetic unit 201, a hard-disk drive device 202 that stores print data uploaded from the information terminal 30, and a communication unit 203 used for communications with an external apparatus. The arithmetic unit 201 and the other components are connected via a bus 204 and signal lines (not illustrated).

The arithmetic unit 201 in this exemplary embodiment includes a processor 201A, a ROM (not illustrated) storing a BIOS or the like, and a RAM (not illustrated) used as a work area. The arithmetic unit 201 functions as what is known as a computer. The functions of the print server 20 to be described later are implemented in such a manner that the processor 201A runs a program.

The hard-disk drive device 202 stores print data and the like in the magnetic disk. The magnetic disk is a nonvolatile storage medium. The hard-disk drive device 202 stores basic software and application programs.

The communication unit 203 includes modules conforming to various communication standards. The communication unit 203 is connected to the network 40 through a mobile communication system abbreviated as LAN, 4G, or 5G.

FIG. 4 is a diagram explaining an example functional configuration of the print server 20 used in Exemplary Embodiment 1.

The print server 20 illustrated in FIG. 4 has the function of a job reception unit 211 that receives a print job from the information terminal 30. The print job includes a printing instruction from the user and corresponding print data.

The print server 20 also has the function of a job accumulation unit 212 that accumulates, in a database 213, print data received by the job reception unit 211 and information related to this print data and other pieces of data. The database 213 is part of a memory area constituting the hard-disk drive device 202 (see FIG. 3). The information related to the print data includes, for example, a job name, a date and time when the print data is received, and a user name.

The database 213 also stores information regarding the print server 20, information regarding the printers 10 to be managed, and information regarding the states of operations of each printer 10.

The print server 20 has the function of a request reception unit 214 that receives a printing start request from one of the printers 10. The printing start request includes information for identifying a printing target. The information required to identify the printing target is provided from the print server 20 to the printer 10 and displayed on the operation display 106 (see FIG. 2) of the printer 10. For example, a list of pieces of print data accumulated in the print server 20 for a user authenticated by using the authentication function of the printer 10 is displayed on the operation display 106. The list is transmitted to the printer 10 via a data transmission unit 215.

The print server 20 has the function of the data transmission unit 215 that transmits, to the printer 10, print data identified on the basis of a request received by the request reception unit 214. In a case where print data is transmitted to the printer 10 first time on the basis of a request from the user, print data corresponding to pages from the initial page in order is transmitted. In contrast, in a case where the print data is retransmitted after an error, the data transmission unit 215 transmits print data generated by an image generation unit 218 to the printer 10.

The print server 20 has the function of an image reception unit 216 that receives, from the printer 10, image data corresponding to an image used for identifying a page from which printing is to be resumed in a case where an error occurs while the printer 10 is performing printing. The image is herein the last page of finished printed pages of a printed material output from the printer 10 or the image of an error page in the printing. The image reception unit 216 receives, from the printer 10, image data corresponding to the image of the last page of finished printed pages or the error page in the printing. The image data corresponding to the image used for identifying the printing resumption page is output from the scanner 102. Note that the user performs an operation for reading the image with the scanner 102. As to be described later, the operation display 106 (see FIG. 2) of the printer 10 displays information for requesting the user to scan the relevant page with the scanner 102 and transmit the page.

The print server 20 has the function of an image analysis unit 217 that analyzes the image received by the image reception unit 216 and identifies which page of the print data has an image corresponding to the received image.

The print server 20 has the function of the image generation unit 218 that generates print data to be retransmitted in accordance with the page identified on the basis of the result of the analysis by the image analysis unit 217. How to identify the print data to be retransmitted depends on the printing mode selected by the user. The printing mode herein includes a printing mode for allocating one page on one side of a sheet, a printing mode for allocating multiple pages on one side of a sheet, a printing mode for allocating one page on each of the front surface and the back surface of a sheet, a printing mode for allocating multiple pages on each of the front surface and the back surface of a sheet, and other printing modes.

Note that the print server 20 knows the state of operations of each managed printer 10 through communications with the printer 10. Upon detecting error occurrence, the print server 20 transitions to a standby state for receiving an image used for identifying a printing resumption page.

Example Screens Presented to User at Error Occurrence

Figure 5A:
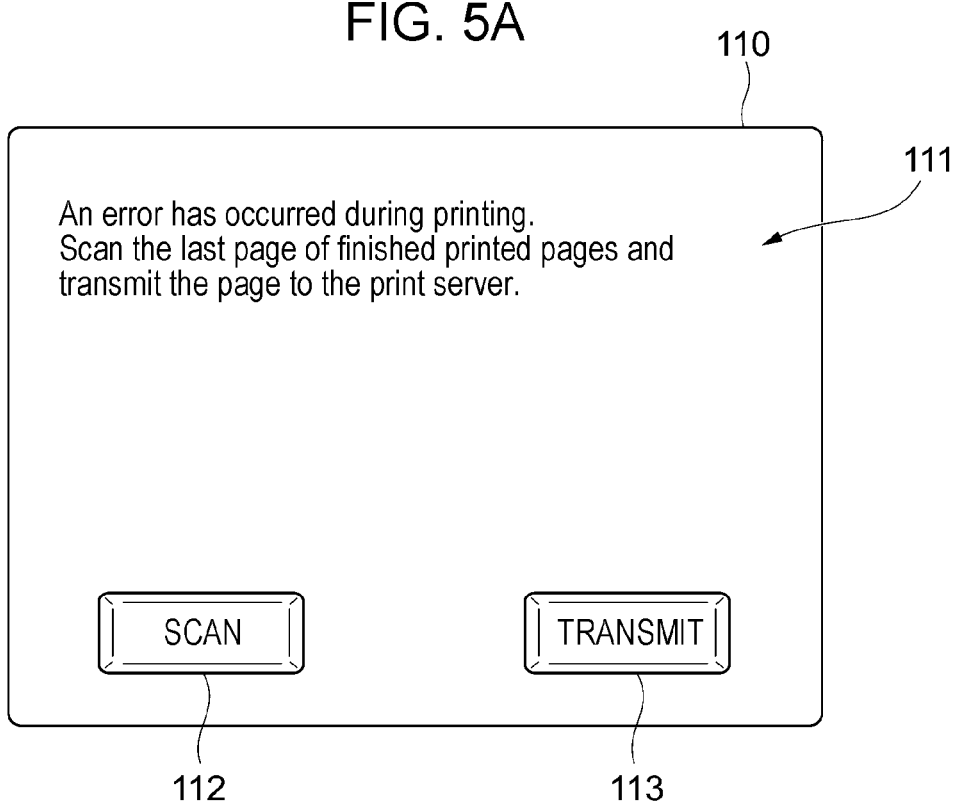
FIGS. 5A and 5B are diagrams each illustrating an example screen presented to a user when an error occurs, FIG. 5A illustrating an example screen presented when the image of the last page of finished printed pages is used for a page from which printing is to be resumed (printing resumption page), FIG. 5B illustrating an example screen presented when the image of a page having an error (error page) is used for a printing resumption page.
Figure 5B:
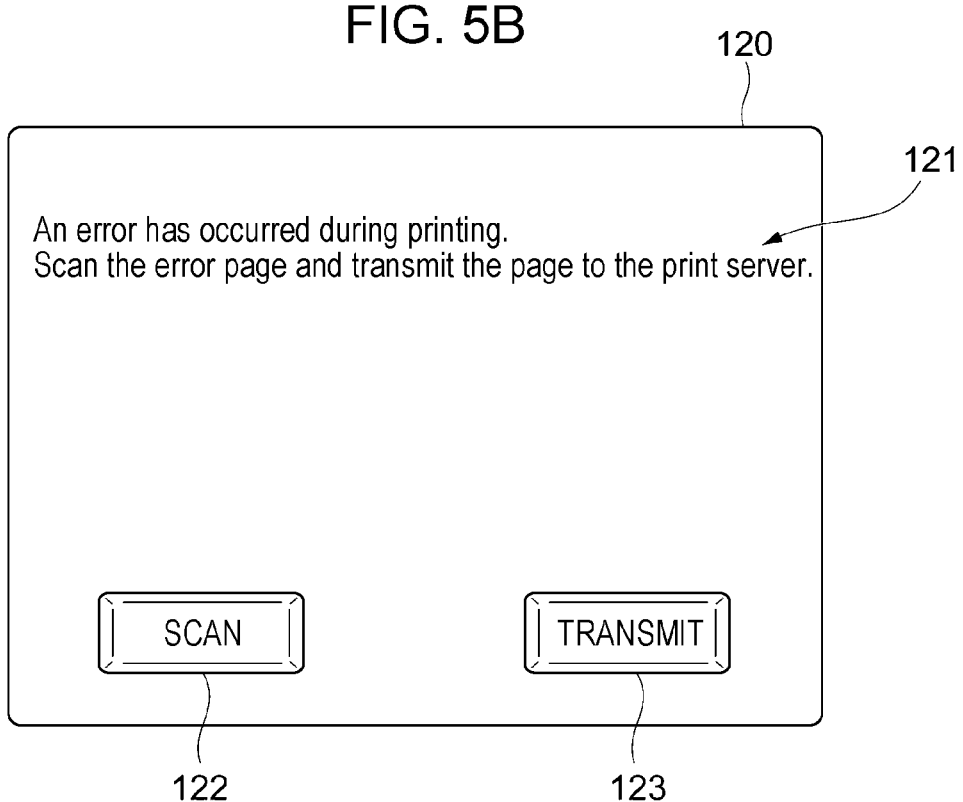

FIGS. 5A and 5B are diagrams each illustrating an example screen presented to the user when an error occurs. FIG. 5A illustrates an example of a screen 110 presented when the image of the last page of finished printed pages is used for a printing resumption page. FIG. 5B illustrates an example of a screen 120 presented when the image of an error page is used for a printing resumption page.

The screens 110 and 120 are displayed on the operation display 106 (see FIG. 2) of the printer 10 (see FIG. 2).

The print server 20 (see FIG. 1) notified of error occurrence may transmit the screens 110 and 120 to the printer 10 (see FIG. 1), or the printer 10 that detects the error occurrence may display the screens 110 and 120 on the operation display 106 as the function of the printer 10.

The screen 110 illustrated in FIG. 5A has a caption 111 for prompting the user to perform an operation, a button 112 used for a scanning start instruction, and a button 113 used for an instruction for transmitting a scanned image. In FIG. 5A, the caption 111 "An error has occurred during printing. Scan the last page of finished printed pages and transmit the page to the print server." is indicated.

The screen 120 illustrated in FIG. 5B has a caption 121 for prompting the user to perform an operation, a button 122 used for a scanning start instruction, and a button 123 used for an instruction for transmitting a scanned image. In FIG. 5B, the caption 121 "An error has occurred during printing. Scan the error page and transmit the page to the print server." is indicated.

Actually, one of the screens 110 and 120 is displayed on the operation display 106 of the printer 10. The screen to be displayed may be specified in the initial settings of the printer 10 or the print server 20 or may be set by an administrator. Alternatively, users may set the screen to be displayed individually.

Nevertheless, if a user knows the details of an operation to be performed for an error, the displaying may be omitted. In addition, if the user disables the displaying, any of the screens 110 and 120 is not displayed.

Processing Details

Hereinafter, the details of processing performed when an error occurs while printing requested by a user is being performed will be described. When receiving a notification of error occurrence during printing from the printer 10, the processor 201A (see FIG. 3) of the print server 20 enters a standby state for receiving, from the printer 10, an image used for identifying a printing resumption page.

FIG. 6 is a flowchart explaining an example of processing performed when the printing mode for allocating one page on one side of a sheet is selected.

FIG. 7 is a flowchart explaining an example of processing performed when the printing mode for allocating multiple pages on one side of a sheet or printing mode for allocating one or more pages on both sides of a sheet is selected. Reference S denotes a step.

The processing operations illustrated in FIGS. 6 and 7 are implemented in such a manner that the processor 201A of the print server 20 runs an application program.

The processor 201A performs processing for the printing mode selected in the print job in a period before image data is received from the printer 10 having an error. Specifically, the processor 201A determines whether the printing mode is the printing mode for allocating one page on one side of a sheet (step S1).

If the printing mode in the print job is the printing mode for allocating one page on one side of a sheet, the processor 201A obtains an affirmative result in step S1.

If the affirmative result is obtained in step S1, the processor 201A identifies a page corresponding to the received image (step S2).

At this time, the content of the image received by the print server 20 from the printer 10 depends on whether an error page is the first page or any of pages starting from the second page.

For example, if an error such as a paper jam or power disconnection occurs while the first page is being printed, a page appropriately printed as a whole is not present. In this case, the print server 20 receives, from the printer 10, for example, the image of the first page hallway printed.

In contrast, if an error occurs while any of pages starting from the second page is being printed, an appropriately printed page is present, and an incompletely printed page is also present. In this case, the print server 20 receives the image of the page scanned by the user in accordance with the screen 110 or 120.

The processor 201A compares the feature of the received image with the feature of each page of print data stored for the corresponding print job and thereby identifies the page corresponding to the image received from the printer 10. For the identification, a technique for recognizing an image is used. This exemplary embodiment assumes a case where an error page includes information enabling a page to be identified as an error page.

After the page corresponding to the image received from the printer 10 is identified, the processor 201A determines whether the received image includes the entire image of the identified page (step S3).

If the received image includes the entire image of the identified page, the processor 201A obtains an affirmative result in step S3. This case signifies that the image of the last page of finished printed pages is received.

In this case, the processor 201A sets, as a retransmission target, print data regarding one or more pages starting from a page subsequent to the identified page (step S4).

In contrast, if the received image does not include the entire image of the identified page, the processor 201A obtains a negative result in step S3. This case signifies that the image of the page having the error during printing is received.

In this case, the processor 201A sets, as the retransmission target, print data regarding one or more pages starting from the identified page (step S5).

After step S4 or step S5, the processor 201A transmits retransmission target print data to a specific printer 10 that requests the retransmission (step S6). The printer 10 having received the print data resumes the printing based on the received print data. In this case, the print data received by the printer 10 is print data regarding one or more pages starting from an unsuccessfully printed page, and thus multiple finished printed pages are absent unlike the case where printing is resumed from the first page every time. In addition, in a case where charging is performed on the basis of the number of sheets output from the printer 10, repeatedly output pages are absent, and thus unnecessary charging is eliminated.

A case where a negative result is obtained in step S1 will be described. The negative result is obtained in a case where the printing mode designated in the print job having the error is not the printing mode for allocating one page on one side of a sheet. FIG. 7 illustrates the operation in this case.

If the negative result is obtained in step S1, the processor 201A identifies a page corresponding to the received image (step S11).

For example, if one page is printed on each of both sides of a sheet, whether the page corresponding to the received image is a page printed on the front surface or a page printed on the back surface is ignored once, and the corresponding page is identified. In this exemplary embodiment, a surface where image printing on the sheet is started first is referred to as a front surface, and a surface opposite thereto is referred to as a back surface. The page is identified by comparing the feature of an image with the feature of each page of print data stored for the corresponding print job.

When multiple pages are printed on one side of a sheet, a case where one page is identified from the received image and a case where multiple pages are identified are conceivable, depending on the layout on the sheet and the printing orientation. Also in these cases, one or more pages included in the image are identified.

Also in a case where multiple pages are printed on each of both sides of a sheet, whether the pages corresponding to the received image are pages printed on the front surface or pages printed on the back surface is ignored once, and the pages included in the image are identified.

After the page corresponding to the image received from the printer 10 is identified, the processor 201A determines whether the received image includes the entire image of the identified page (step S12). If the received image includes information regarding multiple pages, it is determined whether each page includes the entire image.

If at least one page including the entire image is present, the processor 201A obtains an affirmative result in step S12.

In this case, the processor 201A sets, as the retransmission target, print data regarding pages starting from combined pages allocated on the same sheet as that for the page subsequent to the identified page (step S13).

The retransmission target is herein set in units of combined pages. For example, the entire image of the final page of pages allocated on a sheet is included in the image received from the printer 10, print data for multiple pages allocated on the subsequent sheet is set as the retransmission target.

In contrast, if the entire image corresponding to a specific page is included in the image received from the printer 10, but if the page is not the final page of pages allocated on one sheet, print data for the multiple pages allocated on the same sheet is set as the retransmission target.

In contrast, if no page including the entire image is present, the processor 201A obtains a negative result in step S12.

In this case, the processor 201A sets, as the retransmission target, print data regarding pages starting from combined pages allocated on the same sheet as that for the identified page (step S14).

After step S13 or step S14, the processor 201A transmits the retransmission target print data to a specific printer 10 that requests the retransmission (step S15).

Also in this case, the printing is resumed for pages allocated on the same sheet as that for the page having the error during the printing. Accordingly, the layout is not changed, and printing of finished printed sheets are not repeated.

SPECIFIC EXAMPLES

Hereinafter, differences in processing depending on the individual printing modes and the error page will be described specifically.

Example 1

FIG. 8 is a diagram explaining the flow of processing performed in a case where the image of an error page is transmitted to the print server 20 (see FIG. 1) when the error occurs during printing in the printing mode for allocating one page on one side of a sheet.

First, the user transmits print data from the information terminal 30 to the print server 20 (time T1). The print data is accumulated in the print server 20 until the user requests printing from the printer 10.

The user then accesses the print server 20 by operating the printer 10 installed in the shared office or the like and selects a print job intended for printing from the list of print jobs related to them and accumulated in the print server 20. In other words, the user gives an instruction for performing printing (time T2).

The print server 20 having received the instruction transmits the corresponding print data to the requesting printer 10 (time T3). The printer 10 having received the print data starts the printing with the received print data.

In the example in FIG. 8, the printing of the first page is finished, but an error occurs while the second page is being printed (time T4). In this exemplary embodiment, the printing of the second page is finished halfway. The error is caused by, for example, a paper jam or power disconnection.

In the case of the printer 10 used in this exemplary embodiment, the print data is stored in the nonvolatile memory 105 (see FIG. 2), and the print data is not left even if the printing is suspended. Accordingly, the printer 10 needs to obtain the print data again from the print server 20.

In this example, the user scans an image corresponding to a sheet for the second page with the scanner 102 (see FIG. 2) and transmits the image to the print server 20 (time T5).

The print server 20 having received the image from the printer 10 identifies the page of the received image as the second page and incompletion of the printing.

Thereafter, upon receiving a reprinting instruction from the printer 10 with the error eliminated, the print server 20 transmits print data regarding one or more pages starting from the second page to the printer 10 (time T6). The processing here corresponds to step S5 in FIG. 6. Print data corresponding to the first page the printing of which is finished is not retransmitted.

Thereafter, the printer 10 resumes the printing from the second page (time T7), and the printing results of all the pages are consequently obtained (time T8). The printing result of the first page has been output at time T4.

Example 2

FIG. 9 is a diagram explaining the flow of processing performed in a case where the image of the last page of finished printed pages is transmitted to the print server 20 (see FIG. 1) when an error occurs during printing in the printing mode for allocating one page on one side of a sheet.

In FIG. 9, parts corresponding to those in FIG. 8 are denoted by the same references.

Since the flow of the processing from time T1 to time T4 is the same as that in FIG. 8, the explanation thereof is omitted.

In this example, an image requested to be transmitted to the print server 20 is the last page of finished printed pages. Accordingly, the user scans the image corresponding to the first sheet with the scanner 102 (see FIG. 2) and transmits the image to the print server 20 (time T5).

At subsequent time T6, the print server 20 having received the image from the printer 10 identifies the page of the received image as the first page and completion of the printing.

In this example, the page corresponding to the received image is different from that in FIG. 8, but the point where pages needed to be retransmitted are determined as any of pages starting from the second page is the same as in the example illustrated in FIG. 8.

Accordingly, upon receiving a reprinting instruction from the printer 10 with the error eliminated, the print server 20 transmits print data regarding one or more pages starting from the second page to the printer 10. The processing here corresponds to step S4 in FIG. 6.

Thereafter, the printer 10 resumes the printing from the second page (time T7), and the printing results of all the pages are consequently obtained (time T8). The printing result of the first page has been output at time T4.

Example 3

Figure 10C:
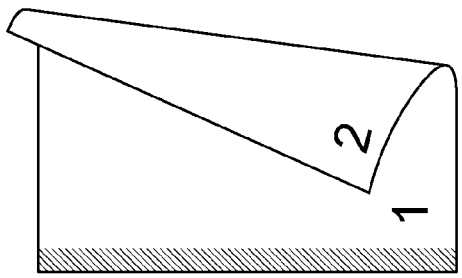
FIGS. 10A, 10B, and 10C are diagrams explaining the flow of processing performed in a case where the image of an error page is transmitted to the print server when an error occurs during printing in a printing mode for allocating one page on each of both sides of a sheet, FIG. 10A illustrating a case where an error occurs while the first page of a document is being printed, FIG. 10B illustrating error occurrence during the printing of the second page of the document, FIG. 10C illustrating the resumption of the printing from the first page of the document.
Figure 10B:
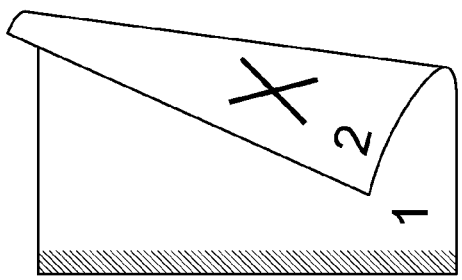
Figure 10A:
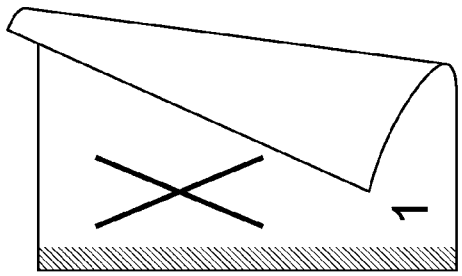

FIGS. 10A, 10B, and 10C are diagrams explaining the flow of processing performed in a case where the image of an error page is transmitted to the print server 20 (see FIG. 1) when the error occurs during printing in the printing mode for allocating one page on each of both sides of a sheet. FIG. 10A illustrates a case where an error occurs while the first page of a document is being printed. FIG. 10B illustrates error occurrence during the printing of the second page of the document. FIG. 10C illustrates the resumption of the printing from the first page of the document.

As illustrated in FIG. 10A, if the error occurs while the first page of the document that is allocated on the front surface of a sheet is being printed, the user transmits the image of the first page of the document to the print server 20. In this case, the print server 20 identifies the page of the received image as the first page of the document. This processing corresponds to step S14 in FIG. 7.

In contrast, as illustrated in FIG. 10B, when the error occurs while the second page allocated on the back surface of a sheet is being printed, the following cases are assumed. The image of the first page is transmitted to the print server 20, or the image of the second page is transmitted. In these cases, the print server 20 identifies the received image as the second page of the document. This processing also corresponds to step S14 in FIG. 7.

Basically, the page of the image to be transmitted to the print server 20 is designated on the screen 110 or 120. The user is likely to scan a wrong page; however, even in such a case, the print server 20 in this exemplary embodiment determines whether the entre image of the page corresponding to the received image is included and thus may correctly determine the page to be retransmitted.

In this example, whichever an error occurs during the printing on the front surface or the back surface, print data for pages allocated on the same sheet is retransmitted to the printer 10. As illustrated in FIG. 10C, the reprinting is thus achieved, with the first page and the second page of the document being respectively allocated on the front surface and the back surface of a sheet.

FIGS. 11A and 11B are diagrams explaining the flow of different processing performed in a case where the image of an error page is transmitted to the print server 20 (see FIG. 1) when an error occurs during printing in the printing mode for allocating one page on each of both sides of a sheet. FIG. 11A illustrates error occurrence during the printing of the fourth page of a document. FIG. 11B illustrates the resumption of the printing from the third page allocated on the same sheet as that for the fourth page that has the error or that is subsequent to the third page as the last page of finished printed pages.

If the user transmits the image of the fourth page having the error, the print server 20 performs step S14 and starts retransmission from print data regarding pages starting from combined pages including not only the fourth page of the document corresponding to the received image but also the third page of the document that is allocated on the same sheet.

In contrast, if the user transmits the image of the third page that is the last page of finished printed pages, the print server 20 performs step S13 and starts retransmission from print data regarding pages starting from combined pages including the third page of the document that is allocated on the same sheet as that for the fourth page subsequent to the page of the received image.

Figures 12A, 12B:
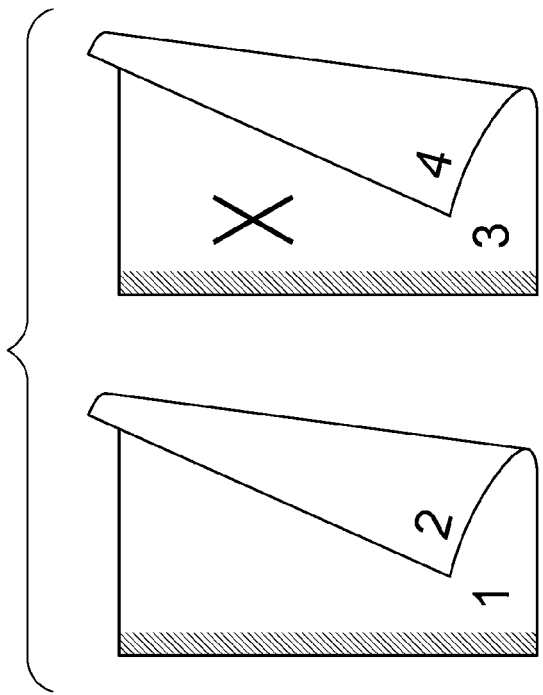
FIGS. 12A and 12B are diagrams explaining the flow of different processing performed in a case where the image of an error page is transmitted to the print server when an error occurs during printing in the printing mode for allocating one page on each of both sides of a sheet, FIG. 12A illustrating error occurrence during the printing of the third page of a document, FIG. 12B illustrating the resumption of the printing from the third page followed by a page allocated on the same sheet as that for the third page that has the error or that is subsequent to the second page as the last page of finished printed pages.

FIGS. 12A and 12B are diagrams explaining the flow of different processing performed in a case where the image of an error page is transmitted to the print server 20 (see FIG. 1) when the error occurs during printing in the printing mode for allocating one page on each of both sides of a sheet. FIG. 12A illustrates a case where an error occurs while the third page of the document is being printed. FIG. 12B illustrates the resumption of the printing from the third page followed by a page allocated on the same sheet as that for the third page that has the error or that is subsequent to the second page as the last page of finished printed pages.

If the user transmits the image of the third page having the error, the print server 20 performs step S14 and starts retransmission from print data regarding pages starting from combined pages including not only the third page of the document that corresponds to the received image but also the fourth page of the document allocated on the same sheet.

In contrast, if the user transmits the image of the second page that is the last page of finished printed pages, the print server 20 performs step S13 and starts retransmission from print data regarding pages starting from combined pages including the fourth page of the document that is allocated on the same sheet as that for the third page subsequent to the page of the received image.

Example 4

Figure 13A:
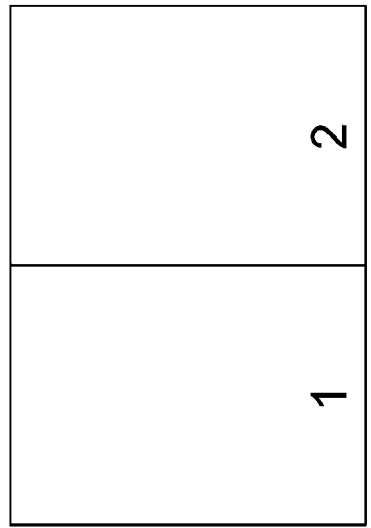
FIGS. 13A, 13B, and 13C are diagrams explaining the flow of processing performed in a case where the image of an error page is transmitted to the print server when an error occurs during printing in a printing mode for allocating two pages on one side of a sheet, FIG. 13A illustrating error occurrence during the printing of the first page of a document, FIG. 13B illustrating error occurrence during the printing of the second page of the document, FIG. 13C illustrating the resumption of the printing from the first page of the document.
Figure 13B:
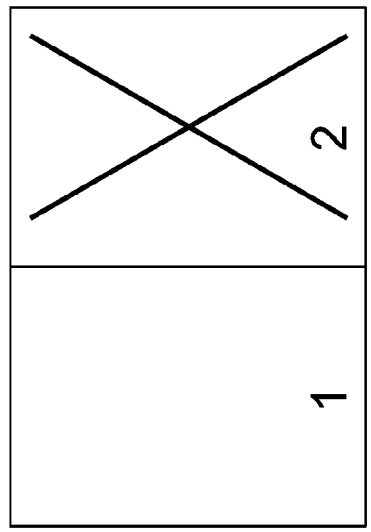
Figure 13C:
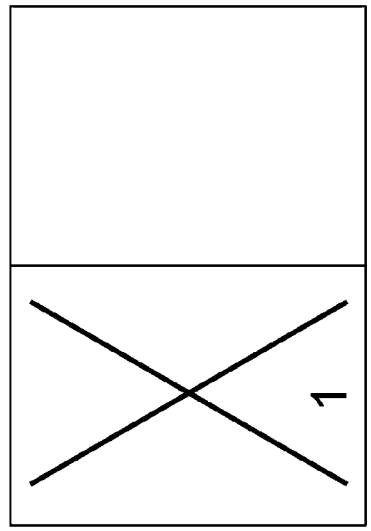

FIGS. 13A, 13B, and 13C diagrams explaining the flow of processing performed in a case where the image of an error page is transmitted to the print server 20 (see FIG. 1) when the error occurs during printing in the printing mode for allocating two pages on one side of a sheet. FIG. 13A illustrates a case where an error occurs while the first page of a document is being printed. FIG. 13B illustrates error occurrence during the printing of the second page of the document. FIG. 13C illustrates the resumption of the printing from the first page of the document.

As illustrated in FIG. 13A, if the error occurs while the first page of the document is being printed, the user transmits the image of the first sheet to the print server 20. In this case, the print server 20 identifies the first page of the document on the basis of the feature of the received image. This processing corresponds to step S14 in FIG. 7.

In contrast, as illustrated in FIG. 13B, if the error occurs while the second page of the document is being printed, the user also transmits the image of the first sheet to the print server 20.

In this case, the print server 20 identifies inclusion of the image of the first page of the document in the received image and noninclusion of the entire image of the second page of the document therein. In this example, the first page of the document is identified as the last page of finished printed pages.

Whichever page is identified, the first page of the document and the second page are allocated as combined pages on the same sheet. Accordingly, as illustrated in FIG. 13C, the printing is resumed from print data regarding one or more pages starting from the first page of the document.

FIGS. 14A and 14B are diagrams explaining the flow of different processing performed in a case where the image of an error page is transmitted to the print server 20 (see FIG. 1) when the error occurs during printing in the printing mode for allocating two pages on one side of a sheet. FIG. 14A illustrates error occurrence during the printing of the third page of the document. FIG. 14B illustrates the resumption of the printing from the first page of the second sheet.

As illustrated in FIG. 14A, if the error occurs while the third page of the document is being printed, the user transmits, to the print server 20, the image of the first sheet including the last page of finished printed pages or the image of the second sheet including the error page.

For example, if the image of the first sheet is received, the print server 20 identifies the second page of the document as the last page of finished printed pages and resumes the printing from combined pages including the fourth page allocated on the same sheet as that for the third page of the document that is subsequent to the identified page. This processing corresponds to step S13 in FIG. 7.

In contrast, if the image of the second sheet is received, the print server 20 identifies the third page having an error of the document. Since the received image does not include the entire image of the third page of the document, the print server 20 resumes the printing from combined pages including the fourth page allocated on the same sheet as that for the third page of the document that is the identified page. This processing corresponds to step S14 in FIG. 7.

Example 5

FIGS. 15A, 15B, 15C, 15D, and 15E are diagrams explaining the flow of processing performed in a case where the image of an error page is transmitted to the print server 20 (see FIG. 1) when the error occurs during printing in the printing mode for allocating two pages on each of both sides of a sheet. FIG. 15A, FIG. 15B, FIG. 15C, FIG. 15D, and FIG. 15E respectively illustrate error occurrence during the printing of the first page, the second page, the third page, the fourth page, and the fifth page of a document.

As illustrated in FIG. 15A, if an error occurs while the first page of the document that is allocated on the front surface of the first sheet is being printed, the user transmits the image of the front surface of the first sheet to the print server 20. In this case, the print server 20 identifies the first page of the document on the basis of the feature of the received image. This processing corresponds to step S14 in FIG. 7.

As illustrated in FIG. 15B, if an error occurs while the second page of the document that is allocated on the front surface of the first sheet is being printed, the user transmits the image of the front surface of the first sheet to the print server 20. In this case, on the basis of the feature of the received image, the print server 20 identifies the last page of finished printed pages as the first page of the document or identifies the error page as the second page of the document.

If the identified page is the first page of the document, the print server 20 performs step S13 in FIG. 7. In this case, print data regarding pages starting from the first page of the document that are allocated on the same sheet as that for the second page of the document that is subsequent to the first page, that is, allocated on the first sheet is set as a resumption target.

In contrast, if the identified page is the second page of the document, the print server 20 performs step S14 in FIG. 7. In this case, print data regarding pages starting from the first page of the document that are allocated on the same sheet as that for the second page of the document, that is, allocated on the first sheet is set as the resumption target.

As illustrated in FIG. 15C, if an error occurs while the third page of the document that is allocated on the back surface of the first sheet is being printed, the user transmits the image of the back surface of the first sheet to the print server 20. In this case, on the basis of the feature of the received image, the print server 20 identifies the error page as the third page of the document.

If the identified page is the third page of the document, the print server 20 performs step S14 in FIG. 7. In this case, the print server 20 sets, as the resumption target, print data regarding pages starting from the first page of the document that are allocated on the same sheet as that for the third page of the document, that is, allocated on the first sheet.

If the image of the front surface of the first sheet including the second page of the document that is the last page of finished printed pages is transmitted to the print server 20, the print server 20 performs step S13 in FIG. 7. Also in this case, the print server 20 sets, as the resumption target, print data regarding pages starting from the first page of the document that are allocated on the first sheet.

As illustrated in FIG. 15D, if an error occurs while the fourth page of the document that is allocated on the back surface of the first sheet is being printed, the user transmits the image of the back surface of the first sheet to the print server 20. In this case, on the basis of the feature of the received image, the print server 20 identifies the error page as the fourth page of the document.

If the identified page is the fourth page of the document, the print server 20 performs step S14 in FIG. 7. In this case, print data regarding pages starting from the first page of the document that are allocated on the same sheet as that for the fourth page of the document, that is, allocated on the first sheet is set as the resumption target.

Note that the third page of the document that is the last page of finished printed pages is also identified from the image of the back surface of the first sheet. In this case, the print server 20 regards the third page of the document as the identified page and performs step S13 in FIG. 7. Also in this case, print data regarding pages starting from the first page of the document that are allocated on the first sheet is set as the resumption target.

As illustrated in FIG. 15E, if an error occurs while the fifth page of the document that is allocated on the front surface of the second sheet is being printed, the user transmits the image of the front surface of the second sheet to the print server 20. In this case, on the basis of the feature of the received image, the print server 20 identifies the error page as the fifth page of the document. If the identified page is the fifth page of the document, the print server 20 performs step S14 in FIG. 7. In this case, print data regarding one or more pages starting from the fifth page of the document that are allocated on the same sheet as that for the fifth page of the document, that is, allocated on the second sheet is set as the resumption target.

If the image of the back surface of the first sheet including the fourth page of the document that is the last page of finished printed pages is transmitted to the print server 20, the print server 20 performs step S13 in FIG. 7. In this case, the print server 20 sets, as the resumption target, print data regarding pages allocated on the same sheet as that for the fifth page that is the page subsequent to the fourth page. That is, the print server 20 retransmits the print data regarding one or more pages starting from the fifth page of the document.

Exemplary Embodiment 2

Figure 16:
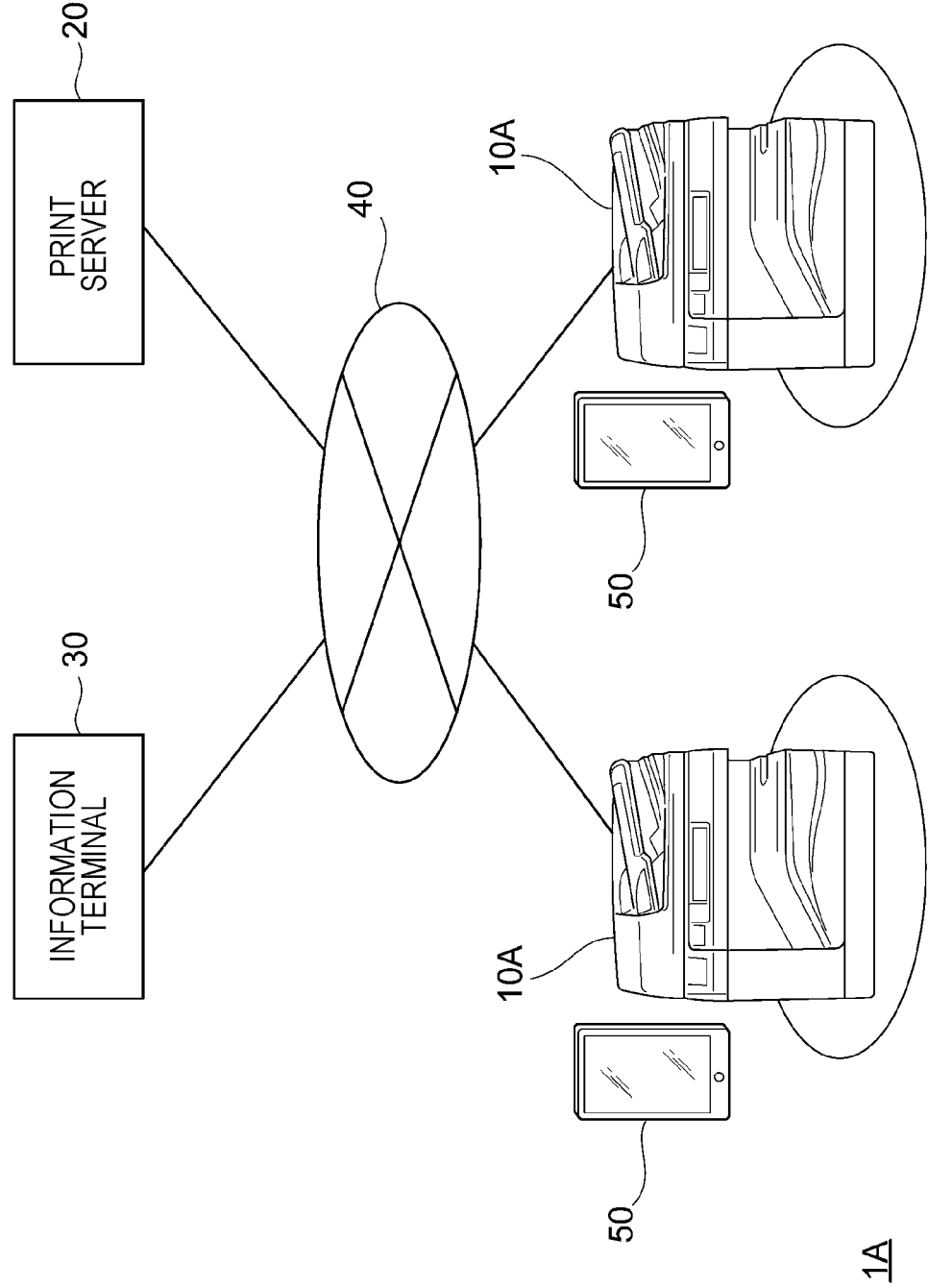
FIG. 16 is a diagram illustrating an example configuration of an information processing system used in Exemplary Embodiment 2.

FIG. 16 is a diagram illustrating an example configuration of an information processing system 1A used in Exemplary Embodiment 2. In FIG. 16, parts corresponding to those in FIG. 1 are denoted by the same references.

Exemplary Embodiment 1 assumes the information processing system 1 (see FIG. 1) including the printers 10 including the scanner 102 (see FIG. 2) that optically reads the image of a document, while this exemplary embodiment assumes the information processing system 1A including printers 10A without the scanner 102 that optically reads the image of a document.

In this exemplary embodiment, a smartphone 50 is used to read the image of a page having an error during printing or the last page of finished printed pages and to transmit the image to the print server 20.

A tablet computer or a digital camera may be used instead of the smartphone 50. If the digital camera does not have a function of communicating with the network 40, data of an image taken with the digital camera is transmitted to the print server 20 via the smartphone 50 or a corresponding one of the printers 10A.

If a printer 10A is not provided with a display or has a small display relative to the screen 110 or 120 (see FIGS. 5A and 5B), the screen 110 (see FIG. 5A) or the screen 120 (see FIG. 5B) may be displayed on the display of the smartphone 50 or the like.

The other operations in this exemplary embodiment are the same as those in Exemplary Embodiment 1.

Other Exemplary Embodiments

The exemplary embodiments of the present disclosure have heretofore been described. The technical scope of the present disclosure is not limited to the scope of the description of the exemplary embodiments above. From the description of the scope of claims, it is apparent that the technical scope of the present disclosure includes various modifications and improvements made to the exemplary embodiments described above.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
      transition to a standby state upon detecting occurrence of an error on a printer that is a destination of transmission of print data, the standby state being for receiving image data for identifying a page from which printing is to be resumed,
      transmit information for requesting a user experiencing suspension of the printing due to the error to obtain and transmit the image data, the information being transmitted to a terminal operated by the user,
      recognize an image of the image data connected with the printer when the image data is received and identify the page from which the printing is to be resumed, and
      retransmit, to the printer, print data for one or more pages starting from the identified page.

2. The information processing apparatus according to claim 1,
   wherein the processor identifies, as the page from which the printing is to be resumed, a page subsequent to a page corresponding to the received image data.

3. The information processing apparatus according to claim 2,
   wherein if the image of the received image data includes an entirety of a page identified from the image data, the processor identifies, as the page from which the printing is to be resumed, the page subsequent to the page corresponding to the image data.

4. The information processing apparatus according to claim 3,
   wherein if a printing mode for allocating a plurality of pages on one side of a sheet is designated, and if the image of the received image data includes the entirety of the identified page, the processor resumes the transmission of the print data from print data corresponding to combined pages allocated on a sheet used for the page subsequent to the identified page.

5. The information processing apparatus according to claim 3,
   wherein if a printing mode for allocating a page on both sides of a sheet is designated, and if the image of the received image data includes the entirety of the identified page, the processor resumes the transmission of the print data from print data corresponding to combined pages allocated on a sheet used for the page subsequent to the identified page.

6. The information processing apparatus according to claim 3,
   wherein if a printing mode for allocating a plurality of pages on each of both sides of a sheet is designated, and if the image of the received image data includes the entirety of the identified page, the processor resumes the transmission of the print data from print data corresponding to combined pages allocated on a sheet used for the page subsequent to the identified page.

7. The information processing apparatus according to claim 1,
wherein the processor identifies a page corresponding to the received image data as the page from which the printing is to be resumed.

8. The information processing apparatus according to claim 7,
wherein if the image of the received image data includes part of a page identified from the image data but does not include an entirety of the identified page, the processor identifies the page corresponding to the image data as the page from which the printing is to be resumed.

9. The information processing apparatus according to claim 8,
wherein if a printing mode for allocating a plurality of pages on one side of a sheet is designated, and if the image of the received image data includes part of the identified page but does not include the entirety of the identified page, the processor resumes the transmission of the print data from print data corresponding to combined pages allocated on a sheet used for the identified page.

10. The information processing apparatus according to claim 8,
wherein if a printing mode for allocating a page on both sides of a sheet is designated, and if the image of the received image data includes part of the identified page but does not include the entirety of the identified page, the processor resumes the transmission of the print data from print data corresponding to combined pages allocated on a sheet used for the identified page.

11. The information processing apparatus according to claim 8,
wherein if a printing mode for allocating a plurality of pages on each of both sides of a sheet is designated, and if the image of the received image data includes part of the identified page but does not include the entirety of the identified page, the processor resumes the transmission of the print data from print data corresponding to combined pages allocated on a sheet used for the identified page.

12. The information processing apparatus according to claim 1,
wherein the processor transmits information for requesting a user to obtain and transmit the image data, the information being transmitted to the printer on which the occurrence of the error is detected.

13. A non-transitory computer readable medium storing a program causing a computer to execute a process comprising:
transitioning to a standby state upon detecting occurrence of an error on a printer that is a destination of transmission of print data, the standby state being for receiving image data for identifying a page from which printing is to be resumed,
transmitting information for requesting a user experiencing suspension of the printing due to the error to obtain and transmit the image data, the information being transmitted to a terminal operated by the user,
recognizing an image of the image data connected with the printer when the image data is received and identifying the page from which the printing is to be resumed, and
retransmitting, to the printer, print data for one or more pages starting from the identified page.

* * * * *